Patented Feb. 15, 1949

2,461,920

UNITED STATES PATENT OFFICE 2,461,920

POLYHYDRIC ALCOHOL MIXED ESTERS

Burt Carlton Pratt, Wilmington, Del., assignor to E. I. du Pont de Nemours & Company, Wilmington, Del., a corporation of Delaware No Drawing. Application January 25, 1944,
Serial No. 519,647

6 Claims. (Cl. 260—76)

This invention relates to polyhydric alcohol esters.

It is an object of this invention to provide new esters of polyhydric alcohols, said esters containing at least three thiol groups. Another object is to provide new mixed esters of polyhydric alcohols with mercaptocarboxylic acids in combination with polycarboxylic acids, said esters containing at least three thiol groups. Still another object is to provide new compositions which are readily insolubilized by exposure to an oxygen-containing atmosphere. A further object is to provide methods for preparing the said new polyhydric alcohol esters.

These objects are accomplished by the following invention of ester compositions comprising polyhydric alcohol esters of carboxylic acids, said esters containing at least three thiol groups, said esters forming films which are capable of being rendered insoluble in organic solvents upon exposure to an oxygen-containing atmosphere.

In one method of practicing this invention, the mercaptocarboxylic acid alone or in conjunction with a polycarboxylic acid is reacted with the desired polyhydric alcohol, preferably in the presence of a water immiscible organic solvent, at a temperature sufficiently high to effect esterification at a reasonably rapid rate.

In the preparation of the polyhydric alcohol esters of this invention, it is generally desirable to maintain an inert atmosphere during the esterification reaction, for example, by slowly bubbling carbon dioxide through the reaction mixture. Water formed during the reaction is carried over by the water immiscible solvent, from which the water is readily removed by an ordinary separator, and the solvent returned to the reaction mixture. The solvent used in the reaction mixture may then be removed by bubbling an inert gas through the ester.

The more detailed practice of the invention is illustrated by the following examples, wherein parts given are by weight. There are, of course, many forms of the invention other than these specific embodiments.

Example I

A mixture of 19 parts of 7-mercaptoheptanoic acid and 4.02 parts of pentaerythritol is heated slowly over a period of 6.5 hours in the presence of one part of xylene in a reactor fitted with a stirrer, gas inlet tube for inert gas, a thermometer, and a reflux condenser, equipped with a take-off tube to permit the removal of water as it is formed and the return of solvent to the reaction mixture, at a temperature in the range of 200° to 228° C. During this period 2.1 parts of water is obtained. The solvent is removed by blowing oxygen-free nitrogen through the ester for 15 minutes at 220° C. On cooling, there is obtained 18 parts of a colorless, viscous oil which has an acid number of 11.1 and a saponification number of 316.8, a refractive index at 25° C. of 1.5063, a total sulfur content of 17.5%, and a thiol sulfur content of 16.5%. With 0.1% iron (added as iron linoleate), the oil yields films which are tack-free and colorless after baking for two hours at 100° C. The films are insoluble in xylene.

Example II

A mixture of 70 parts of mercaptoacetic acid and 23.2 parts of glycerol is gradually raised in temperature from 110° to 185° C. during a period of eight hours in the reactor described in Example I. During this period 13.5 parts of water are obtained. The oily material is blown vigorously with carbon dioxide for ten minutes at 200° C. and on cooling there is obtained 70 parts of a material which contains 4.9 parts of thiol sulfur and 28 parts of total sulfur. With 0.6% of iron (added as iron linoleate), this material yields films which dry on baking for two hours at 100° C.

Example III

A mixture of 20 parts of 7-mercaptoheptanoic acid, 11.5 parts of glycerol, and 18.4 parts of phthalic anhydride is heated at 190° to 200° C. for 2.5 hours in a reactor fitted with a stirrer, gas inlet tube for inert gas, a thermometer, and a reflux condenser equipped with a take-off tube to permit removal of water as it is formed and return of solvent to the reaction mixture. The temperature is then raised to 220° C. and maintained at this temperature for 2.5 hours longer, sufficient Hi-Flash naphtha (a coal tar naphtha having a specific gravity of 0.856 to 0.881 at 25° C. and boiling in the range of about 140° to 195° C.), being added to maintain a vigorous reflux. The water formed is removed continuously. The mixture is cooled and reduced with 12 parts of Hi-Flash naphtha, 16.6 parts of xylene, 14.3 parts of butanol, and 0.2 part of butyl acetate. The solution thus obtained has a viscosity of about 0.5 poise. The acid number of the product is 27.1. Analysis of the product shows it to contain 3.1% of total sulfur and 1.8% of thiol sulfur. Addition of 0.1% of iron (added as iron linoleate) yields compositions from which films are obtained which after baking for 2 hours at 100° C.

are tack-free, tough, and are unaffected after soaking in water for two hours.

*Example IV*

A mixture of 21.3 parts of 9(10)-mercaptostearic acid (prepared according to Example I of Lazier, Signaigo and Werntz Serial No. 411,337, filed September 18, 1941 now Patent No. 2,402,644), 6.2 parts glycerol, and 9.9 parts of phthalic anhydride is heated at 225° C. to 230° C. for six hours in the reactor described in Example I. The product is cooled and reduced with xylene to a total solids content of 70%. The resulting solution has a viscosity of 1.65 poises. The product has an acid number of 11.4. With 0.8% iron (added as iron linoleate), the resulting composition yields films which after baking for two hours at 130° C. are tack-free.

In place of the glycerol and pentaerythritol in the above examples, other monomeric polyhydric alcohols can be used in the preparation of the esters of this invention. Examples of such alcohols include ethylene glycol, propylene glycol, butylene glycol, sorbitol, mannitol, erythritol (butanetetrol-1,2,3,4), dulcitol, methyltrimethylolmethane, butanetriol-1,2,3, pentanetriol-1,2,4, heptanetriol-1,4,7, decanetriol-1,2,4, pentanepentol-1,2,3,4,5, hexanepentol-1,2,3,4,5, 4-methylheptanepentol - 1,2,3,4,6,7, heptanehexol - 1,2,3,4,5,6, heptaneheptol-1,2,3,4,5,6,7, octaneoctol-1,2,3,4,5,-6,7,8 and the like. Of course, in the case of glycols, to obtain an ester having at least three thiol groups, there must be employed a mercaptopolycarboxylic acid, e. g., those below, or a polymercaptocarboxylic acid, e. g., dimercaptobenzoic acid.

The mercaptocarboxylic acid may contain one or more mercapto groups and may be present in any relative amount in comparison with the polycarboxylic acid in those esters in which they are present in combination. The mercaptoacids may be mono- or polycarboxylic and may be substituted or not, provided such substituent groups as may be present do not interfere with the drying characteristics of the resulting polyhydric alcohol ester. These acids may also be strictly aliphatic or may contain carbocyclic or heterocyclic groups. Examples of suitable mercapto acids in addition to mercaptoacetic, mercaptostearic, and mercaptoheptanoic include mercaptopropionic, mercaptovaleric, mercaptodecanoic, mercaptocaproic, mercaptosuccinic, mercaptoadipic, mercaptosebacic, mercaptooleic, mercaptocrotonic, mercaptocinnamic, alpha-mercaptodiphenylacetic, 2-mercaptonicotinic, 3-mercaptopicolinic, 3-mercapto-ortho-toluic and the like.

The polycarboxylic acid may be saturated or unsaturated aliphatic or may be aromatic. Examples of suitable saturated and unsaturated aliphatic carboxylic acids include oxalic, succinic, adipic, sebacic, suberic, decane-1,10-dicarboxylic, dodecanedicarboxylic, maleic, fumaric, citric, tartaric, etc., and of aromatic dicarboxylic acids are phthalic, terephthalic, naphthalic, and the like.

The examples have illustrated the preparation of the polyhydric alcohol esters by reacting the acid with the alcohol. If desired, these esters may be made by first reacting an esterifiable derivative of the acid with the alcohol in the presence of a suitable alcohol interchange catalyst such as sulfuric acid, benzenesulfonic acid, paratoluene sulfonic acid, sodium hydroxide, and the like. In the preparation of the polyhydric alcohol mixed esters, the polyhydric alcohol may be partially acylated with either the mercaptocarboxylic acid or with the polycarboxylic acid and the esterification completed with the other desired component of the mixed ester.

The polyhydric alcohol esters of this invention can be added to bodied or raw drying or semi-drying oils, gums, etc., and the resulting composition compounded with dyes, pigments, fillers and the like. The compositions of this invention may also be blended with such materials as nitrocellulose, organic cellulose ethers, polyacrylates and methacrylates and other vinyl and vinylidene polymers, amide-formaldehyde resins, aldehyde-ketone resins, and oil-soluble phenol-formaldehyde resins.

Iron salts which are soluble in the esters exert a profound accelerating effect upon the insolubilization in organic solvents of films of said esters when exposed to an oxygen-containing atmosphere. Examples of iron salts which are operable are the iron salts of drying oil acids commonly used as varnish and paint driers such as, for example, the iron salts of oleic acid, linseed oil acids, China-wood oil acids, as well as iron resinate.

The compositions of this invention are useful alone and in admixture with drying oils, natural and synthetic gums, cellulose derivatives, etc., as coating compositions, as binders for pigments and fillers, as plasticizers, etc.

The above description and examples are intended to be illustrative only. The invention is not limited to the exact details shown and described for obvious modifications and variations will occur to a person skilled in the art.

What is claimed is:

1. A mixed ester, capable of drying on baking at 100° C. in contact with an atmosphere containing molecular oxygen and in the presence of iron linoleate, consisting of the reaction product of glycerol with 7-mercaptoheptanoic acid and phthalic anhydride in the ratio of 20 parts of 7-mercaptoheptanoic acid and 18.4 parts of phthalic anhydride to 11.5 parts of glycerol.

2. A composition comprising iron linoleate and the ester of claim 1.

3. A composition comprising a mixed ester, capable of drying on baking at 100° C. in contact with an atmosphere containing molecular oxygen and in the presence of iron linoleate, consisting of the reaction product of a polyhydroxyalkane of three to eight hydroxyl groups with a mixture of a hydrocarbon dicarboxylic acid and a mercaptocarboxylic acid containing only carbon, hydrogen, carboxyl oxygen and mercapto sulfur, said ester having dissolved therein an iron salt soluble therein of the class consisting of iron linoleate, iron resinate, iron oleate, and the iron salt of China-wood oil acids.

4. A mixed ester capable of drying on baking at 100° C. in an atmosphere containing molecular oxygen and in the presence of iron linoleate, said ester consisting of the reaction product of a polyhydroxyalkane of three to eight hydroxyl groups with an equimolecular mixture of 7-mercaptoheptanoic acid and phthalic anhydride.

5. A mixed ester capable of drying on baking at 100° C. with an iron linoleate in an atmosphere containing molecular oxygen and in the presence of iron linoleate, said ester consisting of the reaction product of a polyhydroxyalkane of three to eight hydroxyl groups with an equimolecular mixture of phthalic anhydride and a mercaptocarboxylic acid containing only carbon, hydrogen, carboxyl oxygen and mercapto sulfur.

6. A mixed ester capable of drying on baking at 100° C. with iron linoleate in an atmosphere containing molecular oxygen and in the presence of iron linoleate, said ester consisting of the reaction product of a polyhydroxyalkane of three to eight hydroxyl groups with an equimolecular mixture of a hydrocarbon dicarboxylic acid and a mercaptocarboxylic acid containing only carbon, hydrogen, carboxyl oxygen and mercapto sulfur.

BURT CARLTON PRATT.

REFERENCES CITED

The following references are of record in the file of this patent:

UNITED STATES PATENTS

| Number | Name | Date |
|---|---|---|
| 1,780,375 | Bradley | Nov. 4, 1930 |
| 1,955,355 | Alvarado et al. | Apr. 17, 1934 |
| 2,268,185 | Burke et al. | Dec. 30, 1941 |
| 2,343,808 | Schlack | Mar. 7, 1944 |
| 2,374,145 | Taylor | Apr. 17, 1945 |

Certificate of Correction

Patent No. 2,461,920. February 15, 1949.

BURT CARLTON PRATT

It is hereby certified that errors appear in the printed specification of the above numbered patent requiring correction as follows:

Column 3, line 29, for "1, 2, 3, 4, 6, 7," read *1, 2, 4, 6, 7,*; column 4, line 66, claim 5, after the word "with" strike out "an";

and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*